United States Patent
Chatras et al.

(10) Patent No.: US 7,684,558 B2
(45) Date of Patent: Mar. 23, 2010

(54) METHOD FOR ESTABLISHING A DIRECT COORDINATION LINK BETWEEN A FIRST AND SECOND CONTROL CENTRE FOR CARRYING OUT SERVICES

(75) Inventors: Bruno Chatras, Paris (FR); Olivier Cleuziou, Ivry sur Seine (FR)

(73) Assignee: France Telecom, Paris (FR)

( * ) Notice: Subject to any disclaimer, the term of this patent is extended or adjusted under 35 U.S.C. 154(b) by 272 days.

(21) Appl. No.: 10/576,126

(22) PCT Filed: Sep. 29, 2004

(86) PCT No.: PCT/FR2004/002469

§ 371 (c)(1),
(2), (4) Date: Jun. 14, 2006

(87) PCT Pub. No.: WO2005/048557

PCT Pub. Date: May 26, 2005

(65) Prior Publication Data

US 2007/0071227 A1    Mar. 29, 2007

(30) Foreign Application Priority Data

Oct. 17, 2003    (FR)    ................................. 03 12193

(51) Int. Cl.
*H04M 3/00*    (2006.01)

(52) U.S. Cl. ............................ 379/355.04; 379/211.01; 379/212; 379/221.08

(58) Field of Classification Search ............ 379/211.01, 379/221.08, 355.04, 265.01, 265.02, 266.01, 379/266.04, 212
See application file for complete search history.

(56) References Cited

U.S. PATENT DOCUMENTS

| 5,502,759 | A  | * | 3/1996 | Cheng et al. ............. 379/88.02 |
| 5,555,299 | A  | * | 9/1996 | Maloney et al. ......... 379/212.01 |
| 6,463,141 | B1 |   | 10/2002 | Tuunanen et al. |
| 6,466,661 | B2 | * | 10/2002 | Krank et al. ........... 379/212.01 |
| 6,560,327 | B1 |   | 5/2003 | McConnell |
| 6,615,042 | B1 | * | 9/2003 | Britt et al. .................... 455/433 |
| 7,248,576 | B2 | * | 7/2007 | Hoffmann .................... 370/352 |
| 2002/0154756 | A1 |   | 10/2002 | Peeren et al. |

* cited by examiner

*Primary Examiner*—Curtis Kuntz
*Assistant Examiner*—Yosef K Laekemariam
(74) *Attorney, Agent, or Firm*—Young & Thompson

(57) ABSTRACT

The method for establishing a coordination link (40) between a first and second control center (10, 12) for carrying out services, including a stage in which one of the centers (10) transmits its address to the other center (12) by inserting the address in a call control signal transmitted to the other center (12), and a stage in which the center (12) which has received the address inserted into a call control signal establishes the coordination link (40) in order to transport the call control signal used in order to transmit the address of one of the centers to the other center.

11 Claims, 3 Drawing Sheets

Figure 1:
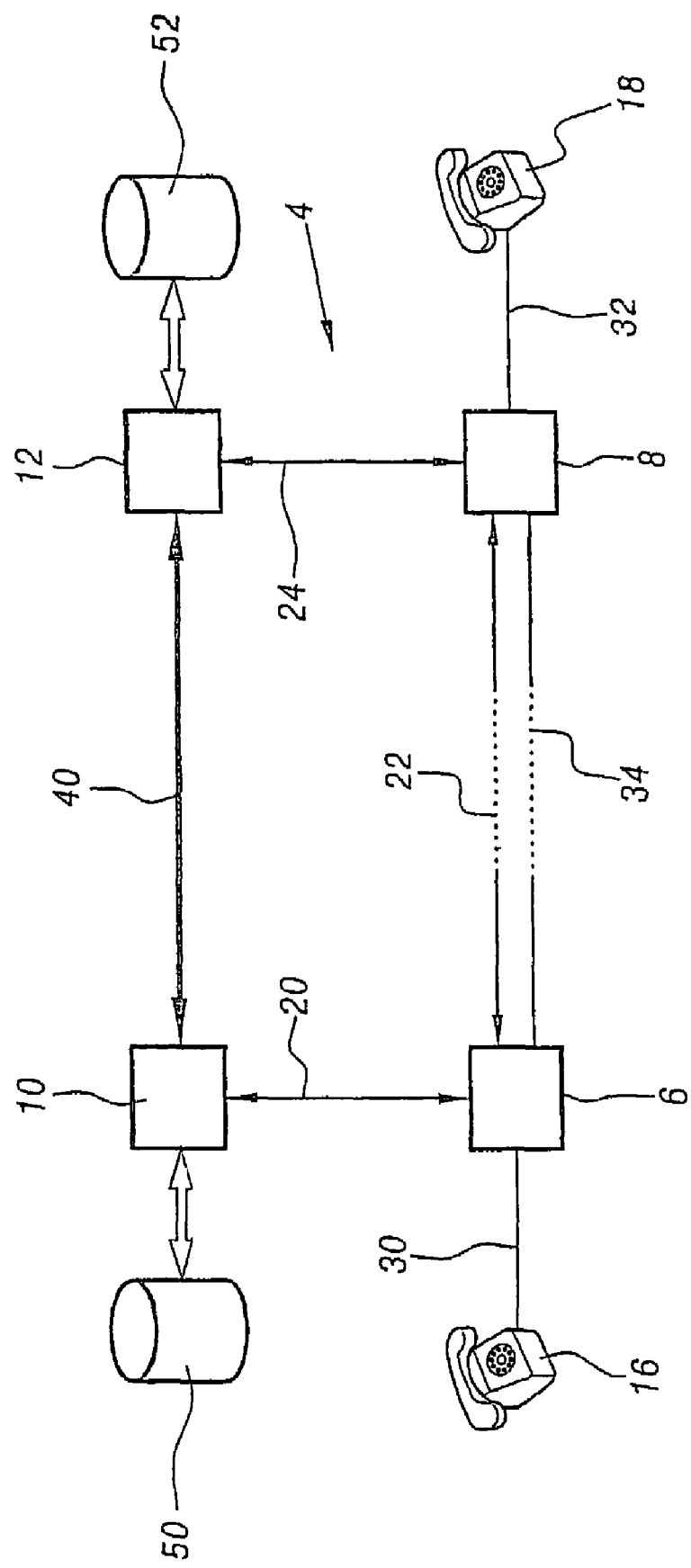

METHOD FOR ESTABLISHING A DIRECT COORDINATION LINK BETWEEN A FIRST AND SECOND CONTROL CENTRE FOR CARRYING OUT SERVICES

The invention relates to a method for establishing a co-ordination connection between a first and a second control centre for carrying out services in an intelligent telecommunications network, the first and the second centres each being capable of processing in an autonomous manner a first and a second service request, respectively, and the network comprising, in addition to communication channels used to establish telecommunications connections between various terminals which are connected to the network, communication channels which are reserved for conveying call control signals for controlling the establishment, the modification and/or the release of each telecommunications connection in this network.

Furthermore, this method comprises a step for processing a call which is initiated each time a call is transmitted by a client and which comprises a step for establishing the co-ordination connection using an address of at least one of the two centres so that these centres can co-ordinate their respective operations for processing the first and second service requests from the client.

Nowadays, intelligent telecommunications networks offer more and more services to their clients. These services are, for example, voice mail boxes, payment services using prepaid cards, voice directory services, etcetera.

These services are carried out by control centres for carrying out services, known under the English acronym SCP (Service Control Point). In the remainder of this description, these centres will be referred to as SCP centres. They are either present in the network or connected thereto.

Each time a service request is transmitted by a client of the network, an SCP centre which is capable of processing this service request is activated. When the user transmits a plurality of service requests during the same call, a plurality of SCP centres must be activated successively or simultaneously. Problems arise when a plurality of services which are incompatible with each other are simultaneously activated by the same client during the same call. For this reason, it is necessary to control the interactions between the various SCP centres which are simultaneously activated and co-ordinate their respective processing operation. Static methods for controlling these interactions have been proposed. For example, these static methods use priority mechanisms or pre-recorded conflict resolution matrices. They have in common that they use rules which are predefined in advance in order to resolve or prevent conflicts between a plurality of services which are requested at the same time. However, these static methods have been found to be difficult to implement in a context in which the number of services increases rapidly since the pre-recorded data must often be updated.

In this context of a rapid increase in the number of services, it has been proposed to control their interactions in a dynamic manner, in particular by providing mechanisms so that the SCP centres can communicate with each other and therefore co-ordinate their processing operation.

To this end, the standards relating to intelligent networks, such as the recommendation UIT-T Q.1248 (Interface Recommendation for Intelligent Network Capability Set 4) provide an interface which allows SCP centres to communicate with each other. The interface mechanism provides for a first centre SCP1 to have the possibility of requesting the implementation of a second service by a second centre SCP2.

The use of this interface requires the establishment of a data transmission connection between the centres SCP1 and SCP2. After this connection has been established, the centre SCP2 receives the instructions for carrying out the service transmitted by the centre SCP1, implements them and transmits the result of their implementation to the centre SCP1, via the same connection. This interface thus allows the centre SCP1 to sub-process service requests to the other centre SCP2.

The use of an interface of this type supposes that the centre SCP1 knows in advance the network address of the centre SCP2 to be contacted. This is found to be difficult when the number of SCP centres is continually increasing. This supposes that the network addresses of the SCP centres available are updated regularly in each of the SCP centres.

The object of the invention is to overcome this disadvantage by providing a method for establishing a co-ordination connection between two SCP centres without these two SCP centres knowing the network address of the other SCP centre in advance.

The invention therefore relates to a method as described above, characterised in that one of the centres transmits its address to the other centre by inserting this address in one of the call control signals transmitted to the other centre, and in that the centre having received the address inserted in a call control signal establishes the co-ordination connection by using communication channels which are separate from those used to convey the call control signal in which the address of one of the centres is inserted.

In the above method, the address of one of the SCP centres is communicated to the other SCP centre during the step for processing the call of the client. The other SCP centre which has received the address is at once capable of establishing a data transmission connection with the SCP centre corresponding to the address received. Using this method, it is no longer necessary for the SCP centres to know, before even beginning the step for processing the call of the client, the address of the or each SCP centre with which a co-ordination connection will have to be established in order to co-ordinate their processing operation.

According to other features of the method in accordance with the invention, it is characterised in that:

when a plurality of call processing steps are carried out simultaneously for different clients of the network, the centre which inserts its address in the call control signal further inserts an identifier for the call processed, and the first and second centres for carrying out services indicate the call concerned by means of the co-ordination data transmitted via the co-ordination connection by using this identifier so as to co-ordinate their respective processing operation for each call;

only the direct co-ordination connection is used to exchange co-ordination data for the respective operations for processing the first and second service requests carried out by the two centres for carrying out services;

the call control signal comprises at least one address field which is capable of receiving the network address of the second centre, this field further comprising a portion which is not used when the address of the second centre is recorded in this field, the address of the first centre and/or the call identifier being inserted in the unused portion of the address field so that these data are propagated jointly via the network to the second centre;

for a network in which the first and second centres are connected to different control points of the network, the control points of the network being capable of connecting the various communication channels to each other in order to form the telecommunications connections, the first centre and second centre communicate with their respective control point by using a first communication protocol for receiving and/or transmitting the call control signals, the various control points of the network communicate with each other by using a second communication protocol which is different from the first for transmitting and/or receiving the call control signals, and the first and second centres communicate with each other via the co-ordination connection by using a third communication protocol which is different from the first and second communication protocols;

the first communication protocol is the INAP protocol and the second communication protocol is the ISUP protocol;

for a network in which the first and second centres are connected to different control points of the network, the control points of the network being capable of connecting the various communication channels to each other in order to form the telecommunications connections, the first centre and the second centre communicate with their respective control point by using a first communication protocol for receiving and/or transmitting the call control signals, the various control points of the network communicate with each other by also using the first protocol, and the first and second centres communicate with each other via the co-ordination connection by using a second communication protocol which is different from the first communication protocol; and the first communication protocol is the SIP protocol (Session Initiation Protocol).

Figures 2, 3:
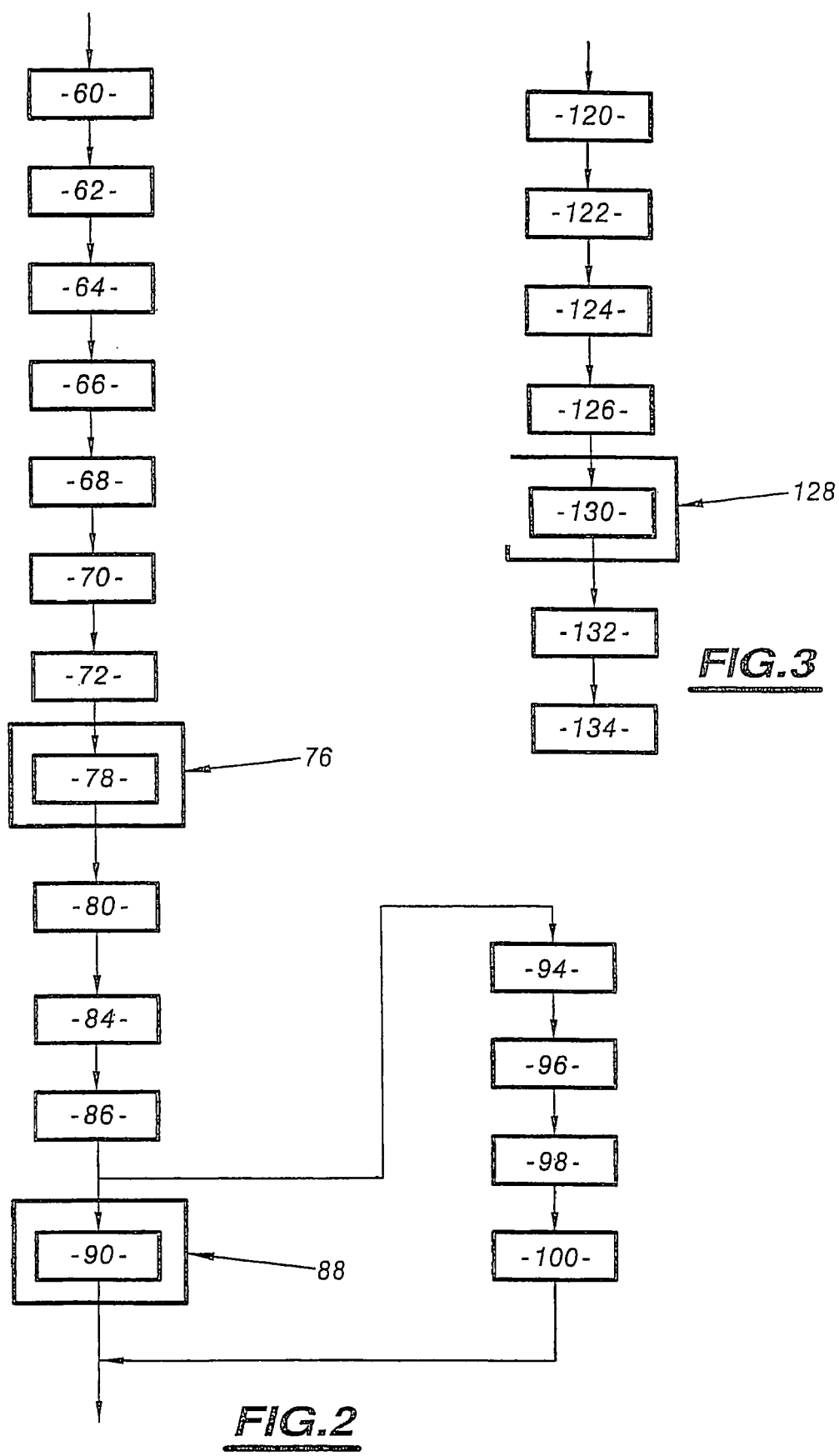
Figure 4A:
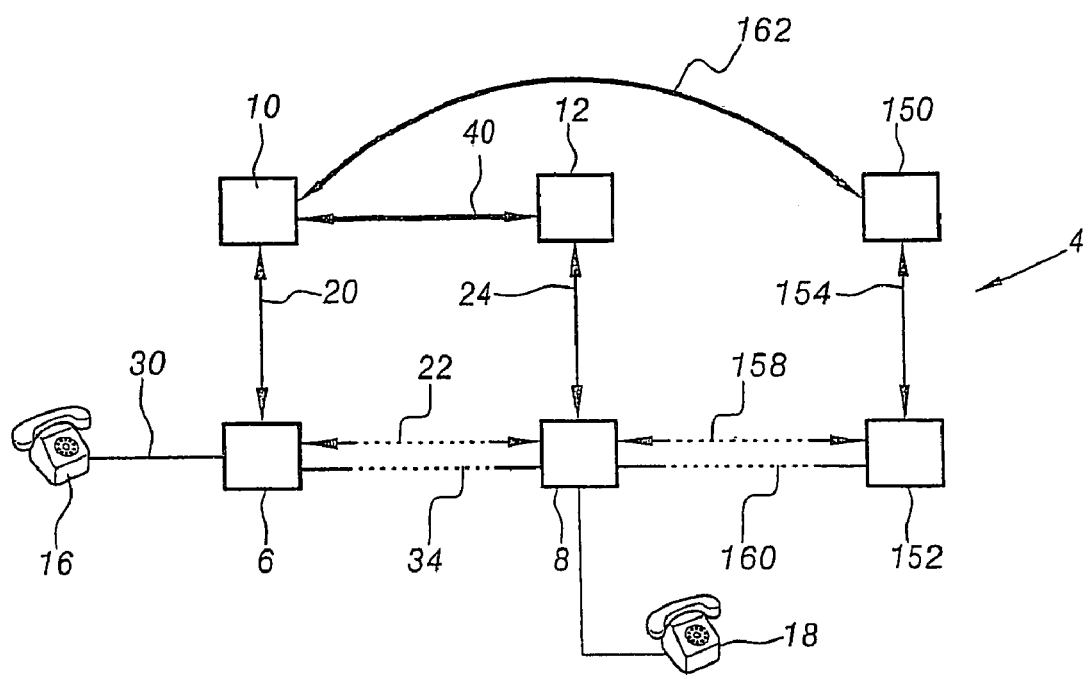
Figure 4B:
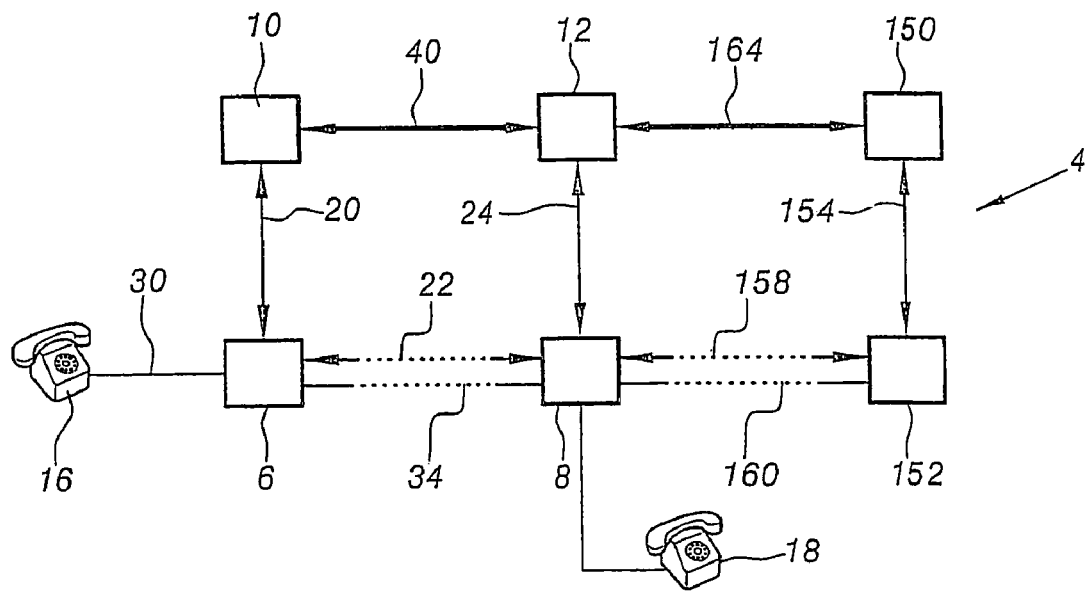

The invention will be better understood from a reading of the following description, given purely by way of example and with reference to the appended drawings, in which:

FIG. 1 is a schematic illustration of the architecture of an intelligent network, FIGS. 2 and 3 are flow charts of examples of methods according to the invention, and FIGS. 4a and 4b are schematic illustrations of two operational variants of the method according to the invention when the intelligent network comprises more than two SCP centres.

FIG. 1 illustrates an intelligent telephone network which is generally designated 4. The network 4 is formed by a large number of items of equipment. In this Figure, the number of items of equipment which form the intelligent network has been minimised in order to simplify the illustration.

The network 4 comprises, for example, a commutated RTC network or RNIS network (Réseau Numérique à Intégration de Services) (=ISDN (Integrated Services Digital Network)) or a network which includes various elements of telecommunications technology. It also comprises, in this instance, an IP (Internet Protocol) network. This network belongs to one or more different operators.

Typically, an intelligent telephone network comprises a number of communication channels which connect the various items of equipment of the network 4 to each other. The items of equipment of the network 4 comprise in particular:

control points 6, 8 which are also referred to as CCP (Call Control Point) commutation centres whose function further involves connecting the various communication channels of the network 4 to each other so as to form a data transmission connection between two terminals;

SCP centres 10, 12 which are each capable of processing, in an autonomous manner, a service request transmitted by a client of the network 4, and telecommunications terminals 16, 18 which are intended to be used by clients of the network 4, either for requesting the implementation of a service, or for communicating with another terminal via a direct data transmission connection.

A control point is referred to as a commutator in an RTC network, a "gate keeper" in an H.323 network or, for example, as a "proxy SIP" in a network which uses the SIP standard (Session Initiation Protocol, standard RFC 3261 of the IETF).

In the remainder of this description, the control points are referred to as CCP points and the data transmission connections established by the CCP points between two terminals are referred to as a telecommunications connection.

In the case of intelligent networks, communication channels of the network are reserved for conveying control signals and in particular call control signals between the various items of equipment of the network. In the remainder of the description, these reserved communication channels will be referred to as control channels.

These call control signals are intended to control the establishment, the modification and/or the release of the telecommunications channels. These signals conform, for example, to one of the following protocols: ISUP (Integrated Service Digital Network-User Part, defined in the recommendations UIT-T Q.761 to 764), INAP (Intelligent Network Application Protocol, defined in the recommendation UIT-T Q.1248), H.225 defined by the UIT-T and SIP (Session Initiation Protocol defined by the IETF).

For a commutated RTC telephone network, the network formed by all the control channels is referred to as a semaphore network. In FIG. 1, double-headed arrows 20, 22 and 24 represent the control channels which connect the centre 10 and the point 6, the points 6 and 8, and the point 8 and the centre 12, respectively.

By way of example, the protocol used to convey the call control signals between the SCP centres and the CCP point to which they are connected is in this case the INAP protocol. Again by way of example, the protocol used to convey the call control signals between the various CCP points is the ISUP protocol in this case.

These INAP and ISUP protocols both comprise a call establishment control message and a confirmation of receipt of this message. In these protocols, the call establishment control message controls the establishment of a telecommunications connection. This message is transmitted by the item of equipment which is calling to a CCP point and comprises in particular the network address of the item of equipment being called. This message is typically transmitted gradually from one CCP point to the following CCP point, as far as the item of equipment called. This message is processed by the various CCP points which have received it, so that a telecommunications connection can ultimately be established between the item of equipment which is calling and the item of equipment which is being called.

In the case of the INAP protocol and the ISUP protocol, these messages are referred to as "connect" and "Message Initial d'addresse" (MIA) (=Initial Address Message (IAM)), respectively. Each of these messages comprises, in addition to the address of the item of equipment being called, unused octets which have, for example, been provided for future extensions of the functionalities of the protocol. For example, the "connect" and "MIA" messages each comprise "ScfID" and "Correlation-ID" parameters which are defined in the standard relating to INAP and ISUP for the connection of an intelligent peripheral.

In FIG. 1, the other communication channels of the network 4 which are intended to establish a telecommunications connection between the various items of equipment of the network 4 are illustrated by single lines which connect the various items of equipment to each other. FIG. 1 illustrates in particular unreserved communication channels 30, 32 and 34 which connect the terminal 16 and the point 6, the terminal 18 and the point 8, and the points 6 and 8, respectively.

FIG. 1 also illustrates with a bold line a connection which connects the centres 10 and 12. The connection 40 is in this instance, for example, a connection which is established by means of the IP network of the network 4.

In FIG. 1, the connection lines between two items of equipment comprising a dotted central portion indicate that this communication channel is optionally carried out by means of other CCP points which are not illustrated in FIG. 1.

In FIG. 1, the terminals 16 and 18 are, for example, conventional fixed or mobile telephone sets.

The CCP points of the network 4 are capable of receiving a call control signal in a format which conforms to the INAP protocol and retransmitting it in an identical state in a format which conforms to the ISUP protocol, and vice-versa.

The centres 10 and 12 are each capable of processing a service request when a client of the network 4 calls. This service is, for example, selected from a group comprising a voice messaging service, a telephone directory service, a payment service using a pre-paid card, a telephone information service and a service for restricting the telephone numbers which can be called.

In order to process the service requests, the centres 10 and 12 are capable of transmitting call control signals on the control channels in order, for example, to establish telecommunications connections between the terminal of the client and another terminal. Furthermore, when the service request to be processed involves the use of a voice server, the centres 10 and 12 are capable of controlling the establishment of a telecommunications connection between the terminal of the client and a voice server then controlling this voice server in order to provide the service requested.

These SCP centres are either embedded directly in the CCP points of the network 4 or formed by data servers which are independent from these CCP points, as illustrated in FIG. 1.

In this case, each of the centres 10 and 12 is also connected to the IP network by means of a supplementary interface which is formed, for example, in this instance by an IP (Internet Protocol) interface card. Each of the centres is thus capable of establishing a telecommunications connection with another centre of the network 4, by using the IP (Internet Protocol) communication protocol.

The centres 10, 12 are capable of allocating an identifier to each call from a client during the processing operation.

The centres 10 and 12 are also associated with respective storage devices 50 and 52. The storage devices 50 and 52 each comprise the IP network address of the centre with which they are associated. These addresses correspond, for example, to the physical address of the centres 10 and 12 or, if the same data server hosts a plurality of services, the address corresponds to the physical IP network address of the server, to which a service identifier is added.

The various CCP points, SCP centres and terminals of the network 4 are produced in conventional manner so as to be capable of carrying out the methods according to FIGS. 2 and 3.

The method for establishing a direct co-ordination connection between the centres 10 and 12 will now be described with reference to FIG. 2 and for the specific case in which the centre 10 is a centre for pre-paid cards and the centre 12 is a voice telephone directory.

In this first embodiment, the centre 10 therefore allows a telecommunications connection to be established with a recipient by paying with a pre-paid card. The server 12 itself enables the telephone number of a recipient to be found from the name of this recipient. In this example, the centre 12 corresponds to the telephone number "12" and the centre 10 to the telephone number "3610".

Initially, the client lifts the receiver of his terminal 16 and dials the number "3610" during a step 60.

During a step 62, the point 6 receives this telephone number and transmits, during a step 64, a request for payment by pre-paid card to the centre 10 by means of the control channel 20.

The centre 10 controls a voice server to inform the client that he must enter his pre-paid card number.

During a step 66, the client then enters the number of his pre-paid card on the keypad of his terminal. This number is transmitted to the centre 10 which verifies the authenticity thereof during step 68. If the number is genuine, the centre 10 determines and allocates a unique identifier corresponding to this call during a step 70.

During a step 72, the client then enters, on the keypad of his terminal 16, the telephone number he wishes to call, in this instance the number "12". The telephone number is transmitted to the centre 10.

The centre 10 transmits on the channel 20, during a step 76, a call establishment control message which contains the number "12" as the telephone number called.

During this step 76, the centre 10 inserts, during an operation 78, its address and the identifier of this call in the octets of the control message normally reserved for the "Scf ID" and "Correlation-ID" parameters.

During a step 80, this control message is then conveyed to the centre 12 via the channels 20, 22 and 24.

When the centre 12 receives the address and the call identifier contained in the control message, it extracts them, during a step 84, then controls, during a step 86, the establishment of the connection 40 to the centre 10, by using to this end the address extracted during step 84 and the IP interface thereof.

During a step 88, the centres 10 and 12 then exchange all the data necessary to co-ordinate their respective processing operations only by means of the connection 40.

To this end, the centres 10 and 12 preferably use a protocol in accordance with that described in the patent application EP-A-1-1 179 959. Each time one of the centres 10 or 12 transmits a piece of data to the other centre, it carries out an operation 90 during which it inserts in the message transmitted to the other centre the call identifier involved in this message. Each centre is thus capable of identifying the call concerned using the data received so that the co-ordination of the processing operations is carried out for each of the calls processed.

During this step 88, the co-ordination data principally relate, for example, to the progress of the processing operation. In this case, the centre 12 thus transmits at regular intervals to the centre 10 the amount which will be deducted from the account associated with the pre-paid card of the client. Other data can also be transmitted via this channel 40, such as, for example, a tariff code, a command for stopping the service, or the like.

At the same time as this step 88, the centre 12 interacts directly with the client during a step 94, for example, the centre 10 controls the establishment of a telecommunications connection between the terminal 16 and a voice server, then controls this voice server in order to acquire data transmitted vocally by the client.

After the telephone number sought by the client has been found, the centre 12 transmits, during a step 96, a message for establishing a telecommunications connection between the terminal 16 and the terminal 18 if the terminal 18 corresponds to the telephone number sought. This message is transmitted via the channel 24 to the point 8.

The centre 12 has finished processing the client request and, during a step 98, it controls the release or the interruption of the telecommunications connection established between the voice server and the terminal 16 by transmitting the corresponding message to the point 8 via the channel 24.

It also releases or interrupts the connection 40 during a step 100.

In the method of FIG. 2, the processing operations of the centres 10 and 12 are thus coordinated so that the service provided by the centre 12 can be paid from a pre-paid card which is controlled by the centre 10.

In the method of FIG. 2, it is the client himself who transmits the first and second service requests by dialling "3610" and "12" respectively. The method of FIG. 3 illustrates a similar method for the specific case in which the client does not himself transmit the service request. The method of FIG. 3 will be described for the specific case in which the centre 10 provides a voice telephone index service which is associated with the line of the terminal 16 and the centre 12 provides a service for listing barred numbers which is also associated with the line of the terminal 16. This list of barred numbers is also referred to as a blacklist.

Since the method of FIG. 3 is for the most part similar to that of FIG. 2, only the specific details of this method relating to that of FIG. 2 will be described in detail.

During a step 120, the client lifts the receiver of his terminal 16.

In response to this action, the point 6 automatically transmits a first service request to the centre 10 during a step 122.

Step 122 is carried out even before the client has dialled any telephone number on the keypad of his terminal 16.

During a step 124, the centre 10 then controls the establishment of a telecommunications connection between the terminal 16 and a voice server, then the centre 10 controls this voice server so that the client can select a telephone number to be called from the voice telephone list. In this instance, it is supposed that the telephone number to be called corresponds to that of the terminal 18.

After the selection of the telephone number to be called has been completed, the centre 10 transmits a first call establishment control message, during a step 126, to the point 6 via the channel 20 in order to control the establishment of a telecommunications connection between the terminals 16 and 18. This first message comprises the address of the centre 10 and the identifier of the call generated by the centre 10.

In response to any call establishment message between the terminal 16 and another terminal, the point 6 automatically and systematically transmits a second service request to the centre 12 during a step 128. The transmission of this second service request brings about the transmission by the point 6 of a second call establishment message to the centre 12. During this step 128, the point 6 inserts, during an operation 130, the address of the centre 10 and the call identifier contained in the first message into this second message. In this manner, the address of the centre 10 and the call identifier are therefore transmitted to the centre 12.

During a step 132, the centre 12 then extracts the address and the call identifier received via the channels 22 and 24 and, during a step 134, controls the establishment of the connection 40. In this instance, the connection 40 is used, inter alia, by the centre 12 in order to indicate to the centre 10 whether the telephone number selected corresponds to one of those recorded on the blacklist. If this is the case, the centre 10 informs the client of this. Otherwise, the centre 12 informs the centre 10 that the telephone number selected does not belong to the blacklist and that processing of the service may continue.

In this embodiment, not only does the centre 10 not know in advance the address of the centre 12 in order to establish a direct connection with the centre 12, but the centre 10 is also not aware of the existence of a second service to be called after the voice index service.

This second embodiment thus shows that it is not necessary for the first SCP centre activated to know that a second SCP centre will be called up later.

FIGS. 4*a* and 4*b* illustrate various possibilities for implementing the methods described with reference to FIGS. 2 and 3, if the number of SCP centres called during the same call is strictly greater than two.

In FIGS. 4*a* and 4*b*, the network 4 comprises a supplementary SCP centre 150 which is connected to a supplementary CCP point 152.

The items of equipment and the channels and connections described above with reference to FIG. 1 have the same reference numerals in FIGS. 4*a* and 4*b*.

The centre 150 is connected to the point 152 by means of a control channel 154.

The point 152 is itself connected to the point 8 by means of a control channel 158 and to the same point 8 by means of an unreserved channel 160.

In FIG. 4*a*, a co-ordination connection 162 connects the centre 150 to the centre 10.

In FIG. 4*b*, this connection 162 is replaced by a co-ordination connection 164 which connects the centre 150 to the centre 12.

The method for establishing the connection 40 of FIGS. 4*a* and 4*b* is identical, either to that of FIG. 2 or to that of FIG. 3.

However, in contrast to the methods of FIGS. 2 and 3, during the operation for processing, for example, the second service request of the client, a third service request is transmitted to the centre 150 which brings about the transmission of a call establishment control signal. In the case of FIG. 4*a*, the centre 12 inserts in this new call establishment control message, the address of the centre 10 and the call identifier transmitted previously by the centre 10. In this manner, in response to receiving these data, the centre 150 establishes the connection 162 with the centre 10 in a similar manner to that which has been described with reference to steps 84 and 86 of FIG. 2. Consequently, in the configuration of FIG. 4, the co-ordination data of the various processing operations taking place are exchanged only between the SCP centre which is called first and each of the SCP centres subsequently called.

In the case of FIG. 4*b*, in a similar manner to that which has been indicated with reference to FIG. 4*a*, during the processing of the second service request, the centre 12 transmits a call establishment control message to the centre 150. However, in contrast to FIG. 4*a*, the centre 12 inserts its own address and call identifier in this message so that the centre 150 does not establish a co-ordination connection with the centre 10, but instead with the centre 12. In the case of FIG. 4*b*, processing co-ordination data are thus exchanged only between two centres which are called successively.

It should be noted that, in the method described above with reference to FIGS. 2, 3, 4*a* and 4*b*, the co-ordination connection follows a path which is different from that taken by the call control signals exchanged between the centres 10 and 12. In this manner, the co-ordination connection does not pass via the CCP centres used to establish the communication during which the services were initiated.

The method described above does not involve pre-recorded and static rules for resolving conflicts between various SCP centres which are called simultaneously. On the contrary, an exchange of co-ordination data between the various SCP centres is established, so that each centre knows the context for carrying out the service and in particular the progress of the services being carried out in the other centres.

Furthermore, the method uses call control signals for transmitting the address of one SCP centre to another SCP centre. All the intelligent networks comprise signals of this type and these signals almost always comprise unused octets for future applications. In this manner, by using these signals to transmit the address and the call identifier of one centre to another, it is not necessary to provide for the use of an additional protocol.

Consequently, the method described in this instance does not require any modification of the CCP points of the network. In particular, no protocol encapsulation mechanism is used in the CCP points, such as, for example, the OCCRUI mechanism (Out Channel Call Related User Interaction). The OCCRUI mechanism allows a protocol to be encapsulated which can be used in the signalling of call controls, the data which are conveyed in this protocol being transparent to the network. However, the use of a mechanism of this type supposes that procedures for establishing, maintaining and releasing a communication channel which is encapsulated in the call control signals is used.

It should also be noted that the method described in this instance does not use a procedure for exchange of co-ordination data via a database which is common to the various SCP centres. Procedures of this type do not allow data to be exchanged which are updated practically in real time, such as, for example, the progress of a service processing operation, since such procedures require an excessively large write-back number in the database.

The methods of FIGS. 2 and 3 have been described in this instance for the specific case in which the address and the call identifier are transmitted from the first SCP centre called to the second SCP centre called. In a variant, however, the address and the call identifier are transmitted from the second centre called to the first centre called. To this end, for example, the second centre called, such as the centre 12, inserts its address and the call identifier in the receipt confirmation for the call establishment control message received. This receipt confirmation has the capacity to propagate in the reverse direction of the call establishment control message received so that it is possible to communicate the address of the second centre called to the first centre called using this receipt confirmation.

The insertion of the address of the centre and the call identifier have been described in this instance for the specific case of the INAP and ISUP protocols. If the protocol used for call control signalling is the SIP protocol, a message "INVITE" containing a parameter "request—URI" is, for example, used in place of the messages "connect" and "M.I.A.". For example, the form of the parameter "request—URI" is as follows:

sip: recipient@francetelecom.com;\ address=x;\ reference=y where x represents the address of the SCP centre and y the call identifier.

The SIP protocol is used between the SCP centres and the CCP points and between the CCP points themselves.

If the telephone network used is a commutated telephone network which uses addresses in accordance with the standard E.164, the address of the SCP centre and the call identifier are inserted in the call establishment control message by using the fact that the number of octets available for writing the address of the recipient is greater than the number of octets actually used to write this address. Consequently, the address of the centre and the call identifier are written in the octets of this field which are still available after the address of the recipient has been written there.

The system of FIG. 1 and the method of FIG. 2 have been described for the specific case in which the co-ordination connection 40 is established via an IP network. In a variant, however, this connection 40 is established by means of any data transmission connection which is capable of establishing a data transmission connection between the centres 10 and 12 by using communication channels which are independent and separate from the channels 20, 22 and 24. For example, in a variant, the connection 40 is established by means of control channels of the network 4 which are different and separate from the channels 20, 22 and 24.

The method of FIG. 2 has been described for the specific case in which the connection 40 can be used for a plurality of different calls. In a variant, the centre 12 transmits the identifier for the call of the client to the centre 10 only when the connection 40 is established. The connection 40 is then reserved for exchange of synchronisation data which relate only to this particular call. Consequently, so that the centre 10 is aware that the information received relates to this call, it is no longer necessary to add a call identifier to each item of data exchanged via the connection 40. The operation 90 is therefore carried out only once regardless of the amount of synchronisation data exchanged.

The invention claimed is:

1. A method for establishing a coordination connection between a first and a second control center for carrying out services in an intelligent telecommunications network, the first and the second centers each being capable of processing in an autonomous manner a first and a second service request, respectively, and the network comprising, in addition to communication channels used to establish telecommunications connections between various terminals which are connected to the network, communication channels which are reserved for conveying call control signals for controlling the establishment, the modification and/or the release of each telecommunications connection in this network, this method comprising a phase for processing a call which is initiated each time a call is transmitted by a client and which comprises a step for establishing the coordination connection using an address of at least one of the two centers so that these centers can coordinate their respective operations for processing the first and second service requests from the client wherein:
in that one of the centres transmits its address to the other center by inserting this address in one of the call control signals transmitted to the other center, and
in that the center having received the address inserted in a call control signal establishes the coordination connection by using communication channels which are separate from those used to convey the call control signal in which the address of one of the centers is inserted.

2. The method according to claim 1, wherein when a plurality of call processing phases are carried out simultaneously for different clients of the network, the center which inserts its address in the call control signal further inserts an identifier of the call processed, and in that the first and second centers for carrying out services indicate the call concerned by means of the coordination data transmitted via the coordination connection by using this identifier so as to coordinate their respective operation for processing each call.

3. The method according to claim 1, wherein only the coordination connection is used to exchange coordination data for the respective operations for processing the first and second service requests implemented by the two centers for carrying out services.

4. The method according to claim 1 for a network, in which the call control signal comprises at least one address field which is capable of receiving the network address of the second centers center, this field further comprising a portion which is not used when the address of the second centers is recorded in this field, wherein the address of the first center and/or the call identifier are inserted in the unused portion of the address field so that these data are propagated jointly via the network to the second centers.

5. The method according to claim 1 for a network, in which the first and second centers are connected to different control points of the network, the control points of the network being capable of connecting the various communication channels to each other in order to form the telecommunications connections, wherein:
    the first centers and the second centre communicate with their respective control point by using a first communication protocol for receiving and/or transmitting the call control signals,
    the various control points of the network communicate with each other by using a second communication protocol which is different from the first for transmitting and/or receiving the call control signals, and
    the first and second centers communicate with each other via the coordination connection by using a third communication protocol which is different from the first and second communication protocols.

6. The method according to claim 5, wherein the first communication protocol is the INAP protocol (Intelligent Network Application Protocol), and in that the second communication protocol is the ISUP protocol (Integrated Service Digital Network-User Part).

7. The method according to claim 1 for a network, in which the first and second centers are connected to different control points of the network, the control points of the network being capable of connecting the various communication channels to each other in order to form the telecommunications connections, wherein
    the first center and the second center communicate with their respective control point by using a first communication protocol for receiving and/or transmitting the call control signals,
    the various control points of the network communicate with each other by also using the first protocol, and
    the first and second centers communicate with each other via the coordination connection by using a second communication protocol which is different from the first communication protocol.

8. The method according to claim 7, wherein the first communication protocol is the SIP protocol (Session Initiation Protocol).

9. An intelligent telecommunications network, the intelligent telecommunications network capable of establishing a coordination connection between a first and a second control center for carrying out services, the intelligent telecommunications network comprising:
    the first and second centers, these centers each being capable of processing in an autonomous manner a first and a second service request, respectively,
    communication channels which are used to establish telecommunications connections between various terminals which are connected to the network, and
    communication channels which are reserved for conveying call control signals in order to control the establishment, the modification and/or the release of each telecommunications connection for this network,
    this network being capable of carrying out a phase for processing a call which is initiated each time a call is transmitted by a client and which comprises a step for establishing the coordination connection using an address of at least one of the two centers so that these centers can coordinate their respective operations for processing the first and second service requests from the client,
    wherein in that one of the centres transmits its address to the other center by inserting this address in one of the call control signals transmitted to the other center, and
    in that the center having received the address inserted in a call control signal establishes the coordination connection by using communication channels which are separate from those used to convey the call control signal in which the address of one of the centers is inserted.

10. A center for controlling the carrying out of services which is suitable for being used in an intelligent telecommunications network, wherein this center is capable of establishing a coordination connection with another center comprising:
    the center capable of processing in an autonomous manner a first and a second service request, respectively,
    communication channels which are used to establish telecommunications connections between various terminals which are connected to the network, and
    communications channels which are reserved for conveying call control signals in order to control the establishment, the modification and/or the release of each telecommunications connection for this network,
    this network being capable of carrying out a phase for processing a call which is initiated each time a call is transmitted by a client and which comprises a step for establishing the coordination connection using an address of the centre so that these center can coordinate its respective operations for processing the first and second service requests from the client with an other center,
    wherein the centre transmits its address to the other center by inserting this address in one of the call control signals transmitted to the other center, and
    in that the other centre having received the address inserted in a call control signal establishes the coordination connection by using communication channels which are separate from those used to convey the call control signal in which the address of one of the center is inserted.

11. The method according to claim 1, wherein the address of the centers is an IP network address.

* * * * *